United States Patent [19]

Honda et al.

[11] Patent Number: 4,517,274
[45] Date of Patent: May 14, 1985

[54] METHOD FOR DEVELOPING ELECTROSTATIC LATENT IMAGES

[75] Inventors: Nobuyasu Honda, Tenri; Toshiro Yamakawa, Osaka; Toshimitsu Ikeda, Himeji, all of Japan

[73] Assignee: Mita Industrial Co., Ltd., Osaka, Japan

[21] Appl. No.: 527,822

[22] Filed: Aug. 30, 1983

[30] Foreign Application Priority Data

Aug. 31, 1982 [JP] Japan .................................. 57-149888
Oct. 22, 1982 [JP] Japan .................................. 57-184730
Feb. 28, 1983 [JP] Japan .................................. 58-31033

[51] Int. Cl.$^3$ ........................ G03G 9/14; G03G 13/09
[52] U.S. Cl. ................................. 430/122; 430/106.6; 118/657; 118/658
[58] Field of Search ............... 118/657, 658; 430/104, 430/106.6, 120, 122

[56] References Cited

U.S. PATENT DOCUMENTS

| | | | |
|---|---|---|---|
| 3,929,657 | 12/1975 | Jones | 430/106.6 |
| 3,996,392 | 12/1976 | Berg et al. | 430/120 |
| 4,075,391 | 2/1978 | Berg et al. | 430/104 |
| 4,142,981 | 3/1979 | Bean et al. | 430/106.6 |
| 4,165,393 | 8/1979 | Suzuki et al. | 430/106.6 |
| 4,331,757 | 5/1982 | Tanaka et al. | 430/106.6 |
| 4,378,753 | 4/1983 | Ueno et al. | 118/657 |
| 4,436,803 | 3/1984 | Ikeda et al. | 430/122 |

Primary Examiner—John E. Kittle
Assistant Examiner—John L. Goodrow
Attorney, Agent, or Firm—Sherman & Shalloway

[57] ABSTRACT

Disclosed is a method for developing electrostatic latent images, which comprises frictionally contacting the surface of a substrate having an electrostatic latent image formed thereon with a magnetic brush of a developer formed on a developer-delivering sleeve having a magnet disposed therein, wherein a magnetic brush is formed on the sleeve with an earing promoting component comprising sintered ferrite particles having a particle size of 20 to 100 microns and a developer component comprising particles of a dispersion of a magnetic powder in a binder medium having a particle size of 5 to 50 microns.

8 Claims, 10 Drawing Figures

METHOD FOR DEVELOPING ELECTROSTATIC LATENT IMAGES

BACKGROUND OF THE INVENTION (1) Field of the Invention

The present invention relates to a method for developing electrostatic latent images. More particularly, the present invention relates to an improvement in the method for developing an electrostatic latent image with a magnetic brush of a magnetic developer, in which good earing of the magnetic brush is maintained.

(2) Decription of the Prior Art

As the developer for use in the magnetic brush development of an electrostatic latent image, there are known two types of developers, that is, a two-component type developer comprising a mixture of an electroscopic powder (toner) having a fixing property and a magnetic carrier and a one-component type magnetic developer comprising particles of a dispersion of a magnetic powder in a binder medium having a fixing property.

In the two-component type developer, it is necessary to charge the toner particles by friction of the toner with the magnetic carrier, and this developer is defective in that a good image cannot be obtained unless the mixing ratio between the magnetic carrier and the toner is kept within a certain range. Furthermore, while the developer is used for a long time, the toner or toner component is deposited and accumulated on the surface of the magnetic carrier (so-called spent toner is formed), and charging of the toner becomes difficult.

The one-component type magnetic developer is advantageous in that troublesome use of a magnetic carrier as in case of the two-component type developer can be avoided, but when the one-component type magnetic developer is used, it often happens that earing of the magnetic brush is considerably changed according to environmental changes such as changes of the temperature and humidity and it is difficult to keep a constant earing quantity of the magnetic brush. In case of the one-component type magnetic developer, it is the developer per se that forms ears of the magnetic brush, and since earing is effected while the developer particles are moved on a sleeve with rotation of the developing sleeve or rotation of a magnet in the sleeve, if the flowability (which also is changed according to the environmental changes) is changed, the earing quantity of the magnetic brush is changed.

Furthermore, in the one-component type magnetic developer, various problems arise because the threshold value of the development is determined according to the magnetic force of attracting the developer to the sleeve and the Coulomb force of attracting the developer to the electrostatic latent image. More specifically, since the magnetic material is embedded in a resin, the magnetic force of attracting the developer to the developing sleeve is weaker than the attractive force of the magnetic carrier, fogging is readily caused at the development. Furthermore, if the flowability of the developer particles is reduced, the frictional charging among the particles becomes insufficient, with the result that the image density is reduced.

SUMMARY OF THE INVENTION

It is a primary object of the present invention to provide a method for developing an electrostatic latent image with a magnetic brush of a one-component type magnetic toner, in which good earing of the magnetic brush is always maintained irrespectively of environmental changes and frictional charging of the toner in the magnetic brush is performed effectively.

Another object of the present invention is to provide a developing method in which blocking of magnetic toner particles is prevented and formation of white lines due to incorporation of a paper powder or foreign material into the developer or coarsening of the particles is prevented.

It was found that when a magnetic brush is formed on a sleeve with an earing promoting component comprising sintered ferrite particles having a particle size of 20 to 100 microns and a developer component comprising particles of a dispersion of a magnetic powder in a binder medium having a particle size of 5 to 50 microns, good earing of the magnetic brush is maintained irrespectively of environmental changes and even if the concentration of the developer component is greatly changed, an image having a high density and a good quality can be obtained, and that when the above-mentioned earing promoting component is used, the developing efficiency of the developer is prominently improved over the developing efficiency attained when other magnetic materials are used.

More specifically, in accordance with the present invention, there is provided a method for developing electrostatic latent images, which comprises frictionally contacting the surface of a substrate having an electrostatic latent image formed thereon with a magnetic brush of a developer formed on a developer-delivering sleeve having a magnet disposed therein, wherein a magnetic brush is formed on the sleeve with an earing promoting component comprising sintered ferrite particles having a particle size of 20 to 100 microns and a developer component comprising particles of a dispersion of a magnetic powder in a binder medium having a particle size of 5 to 50 microns.

DETAILED DESCRIPTION OF THE PREFERRED EMBODIMENTS

Figure 1:
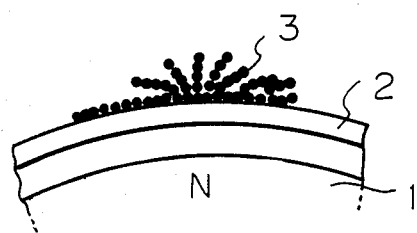
FIG. 1 is a diagram illustrating earing of a conventional one-component type magnetic developer.

In the ordinary magnetic brush developing method, as shown in FIG. 1, when a magnetic developer 3 is supplied onto a developer delivering sleeve 2 provided with a magnet 1, the developer particles are moved on the surface of the sleeve while it is rotated, and earing is caused at a position corresponding to the magnetic pole N or S to form a magnetic brush.

Figure 2:
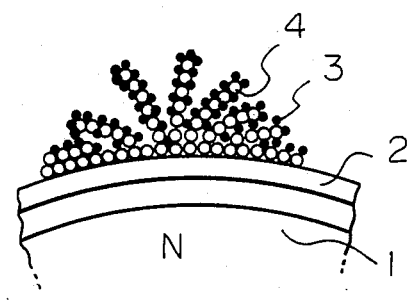
FIG. 2 is a diagram illustrating earing of a developer of the present invention comprising an earing promoting component and a magnetic developer component.

In the present invention, as shown in FIG. 2, a developer component 3 comprising particles of a dispersion of a magnetic powder in a binder medium having a particle size of 5 to 50 microns is combined with an earing promoting component 4 comprising sintered ferrite particles having a particle size of 20 to 100 microns to form a magnetic brush on the sleeve 2.

Since this earing promoting component 4 is composed solely of sintered ferrite particles, this component 4 is excellent over the developer component 3 comprising a dispersion of a magnetic powder in a binder medium in the magnetic properties, and therefore, the component 4 has a function of maintaining good earing of the magnetic brush.

Generally, since a magnetic developer comprises a binder medium, the flowability is reduced with elevation of the temperature and blocking is caused in an extreme case. This reduction of the flowability or occurrence of blocking results in reduction of the earing amount of the magnetic brush, and reduction of the image quality due to blurring or formation of white lines is caused. Reduction of the flowability or occurrence of blocking is caused by dewing on the surfaces of the developer particles as well as by elevation of the temperature. In contrast, if the ear promoting component of the present invention is incorporated, good earing is always maintained in the magnetic brush irrespectively of such environmental changes, and reduction of the image quality due to blurring or formation of lines can effectively be controlled.

Furthermore, by incorporating sintered ferrite particles having good magnetic properties as described above, a mixing and stirring effect is given to the developer when the developer is delivered on the sleeve, and the developer component is kept in the powdery state excellent in the flowability irrespectively of environmental changes such as changes of the temperature and humidity. This is another advantage attained by the present invention.

The developer of the present invention is distinguishable from an ordinary two-component type magnetic developer in the point where the developer component, that is, the toner, is composed of particles of a dispersion of a magnetic powder in a binder medium, and one of the important features of the present invention is that the earing promoting component is composed of sintered ferrite particles.

The developer component used in the present invention exerts a developing action based on the balance between the magnetic attractive force to the sleeve and the electrostatic attractive force (Coulomb force) to the electrostatic latent image as well as an ordinary one-component type magnetic developer, and the developing function of the developer of the present invention is different from that of an ordinary two-component type developer in the point where the threshold value at the development is determined irrespectively of the earing promoting component or carrier. Accordingly, in the developing method of the present invention, even if the weight ratio of the earing promoting component to the developer component is changed in a broad range of from 80/20 to 10/90, especially from 65/35 to 20/80, the density of the formed image is maintained at a substantially equal high level. This is one of the important features of the present invention. Table 1 given hereinafter indicates that even if the mixing ratio of both the components is changed in a broad range, the image density is maintained at a substantially equal high level.

In the present invention, in view of the developing efficiency, it is important that the earing promoting component should be composed of sintered ferrite particles. A known magnetic carrier (so-called iron powder carrier) has a residual magnetism of 10 to 20 e.m.u./g and a coercive force of 10 to 30 Oe, but the sintered ferrite particles used in the present invention have a residual magnetism of 0 to 1.0 e.m.u./g and a coercive force of 0 to 5 Oe. In a combination of a conventional magnetic carrier with a conventional magnetic toner, since both the residual magnetism and coercive force of the carrier are large, the magnetic toner is not readily separated from the surface of the carrier and a problem of reduction of the developing efficiency arises. This defect is similarly observed when particles formed by binding magnetite ($Fe_3O_4$) with a resin are used as the earing promoting component. In contrast, if sintered ferrite particles are used as the earing promoting component according to the present invention, since the residual magnetism and coercive force of this component are 1/10 to 1/20 of those of the conventional magnetic carrier, the earing promoting component is effective for forming a magnetic brush of good earing but the earing promoting component per se is not magnetized, and therefore, a good developing efficiency is attained.

If the particle size of the sintered ferrite particles is smaller than 20 microns, it is difficult to maintain good earing of the magnetic brush, and if the particle size of the sintered ferrite particles exceeds 100 microns, scratches ordinarily called "brush marks" are often formed in the obtained toner image.

The sintered ferrite particles used in the present invention are known. For example, particles of sintered ferrite of at least one composition selected from zinc iron oxide ($ZnFe_2O_4$), yttrium iron oxide ($Y_3Fe_5O_{12}$), cadmium iron oxide ($CdFe_2O_4$), gadolinium iron oxide ($Gd_3Fe_5O_{12}$), copper iron oxide ($CuFe_2O_4$), lead iron oxide ($PbFe_{12}O_{19}$), nickel iron oxide ($NiFe_2O_4$), neodium iron oxide ($NdFeO_3$), barium iron oxide ($BaFe_{12}O_{19}$), magnesium iron oxide ($MgFe_2O_4$), manganese iron oxide ($MnFe_2O_4$) and lanthanum iron oxide ($LaFeO_3$). Sintered ferrite particles composed of manganese zinc iron oxide are especially preferred for attaining the objects of the present invention.

The shape of the sintered ferrite particles is not particularly critical, but spherical sintered particles are advantageously used. Of course, sintered particles having an indeterminate shape can be used.

The developer component used in the present invention comprises particles of a dispersion of a magnetic powder in a binder medium. The composition and preparation process may be the same as those of the known one-component type magnetic developer.

A resin having a fixing property under heat or pressure is used as the binder medium. A thermoplastic resin or an uncured product or precondensate of a thermosetting resin may be used. Valuable natural resins are balsam, rosin, shellac and copal. These natural resins may be modified with at least one member selected from vinyl resins, acrylic resins, alkyd resins, phenolic resins, epoxy resins and oleoresins as described below. As the synthetic resin that can be used as the binder, there can be mentioned vinyl resins such as vinyl chloride resins, vinylidene chloride resins, vinyl acetate resins, vinyl acetal resins, e.g., polyvinyl butyral, and vinyl ether polymers, acrylic resins such as polyacrylic acid esters, polymethacrylic acid esters, acrylic acid copolymers and methacrylic acid copolymers, olefin type resins such as polyethylene and polypropylene, styrene type resins such as polystyrene, hydrogenated styrene resins, polyvinyl toluene and styrene copolymers, polyamide resins such as nylon 12, nylon 6 and polymerized fatty acid modified polyamides, polyesters such as polyethylene terephthalate/isophthalate and polytetramethylene terephthalate/isophthalate, alkyd resins such as phthalic acid resins and maleic acid resins, phenol-formaldehyde resins, ketone resins, coumarone-indene resins, terpene resins, amino resins such as urea-formaldehyde resins and melamine-formaldehyde resins, and epoxy resins. Mixtures of two or more of these resins, for example, a mixture of a phenolic resin and an epoxy resin and a mixture of an amino resin and an epoxy resin, may be used.

A wax may be used as the binder medium. For example, there can be used waxes in a narrow sense such as carnauba wax, cotton wax, candelilla wax, sugar cane wax, bees wax and wool wax, mineral waxes such as montan wax, paraffin wax and microcrystalline wax, solid higher fatty acids having 16 to 22 carbon atoms such as palmitic acid, stearic acid, hydroxystearic acid and behenic acid, amides of higher fatty acids having 16 to 22 carbon atoms (by the term "higher" given hereinafter is meant "having 16 to 22 carbon atoms") such as oleic acid amide, stearic acid amide, palmitic acid amide, N-hydroxyethyl-hydroxystearoamide, N,N'-ethylene-bis-stearoamide, N,N'-ethylene-bis-ricinolamide and N,N'-ethylene-bis-hydroxystearylamide, alkali metal salts, alkaline earth metal salts, zinc salts, aluminum salts and other metal salts of higher fatty acids such as calcium stearate, aluminum stearate, magnesium stearate and calcium palmitate, higher fatty acid hydrazides such as palmitic acid hydrazide and stearic acid hydrazide, p-hydroxyanilides of higher fatty acids such as myristic acid p-hydroxyanilide and stearic acid p-hydroxyanilide, $\beta$-diethylaminoethylester hydrochlorides of higher fatty acids such as stearic acid $\beta$-diethylaminoethyl ester hydrochloride and lauric acid $\beta$-diethylaminoethyl ester hydrochloride, higher fatty acid amide-formaldehyde condensates such as palmitic acid amide-formaldehyde condensate and stearic acid amide-formaldehyde condensate, salt-forming reaction products of one mole of an amino group-containing dye or dye base with more than 4 moles of a higher fatty acid such as stearic acid, palmitic acid or myristic acid, hardened oils such as hardened caster oil and hardened beef tallow oil, and polyethylene wax, polypropylene wax and oxidized polyethylene.

As the magnetic powder, there may be used magnetite ($Fe_3O_4$), $\gamma$-diiron trioxide ($\gamma$-$Fe_2O_3$), and magnetic materials mentioned above with respect to the earing promoting component. In the present invention, it is preferred that the amount of the magnetic powder in the particles of the developer component be 45 to 75% by weight based on the sum of the binder medium and magnetic powder.

The developer component of the present invention may be used in the form of a so-called conductive magnetic developer. In this case, a conducting agent such as carbon black is incorporated in the particles of the developer component or a conducting agent such as carbon black is scattered or further embedded onto the surfaces of the particles of the developer component, so that the resistivity of the developer component is $10^4$ to $10^{12}$ $\Omega$-cm. In case of this conductive developer component, charging of the particles of the developer component is effected by dielectric polarization, and development becomes possible.

Furthermore, the developer component of the present invention may be used in the form of an insulating magnetic developer. In this case, the resistivity of the developer component is adjusted to a level higher than $10^{13}$ $\Omega$-cm. In this developer, in order to maintain a certain polarity in the frictional charging, a known negative or positive charge controlling agent may be blended.

In the developer component of each type, granulation can easily be accomplished by melt-kneading the respective ingredients, cooling the kneaded mixture and pulverizing it. Furthermore, a granulation product can be prepared by dispersing the magnetic powder in a resin solution and spray-granulating the dispersion. The shape of the particles is not particularly critical, and the particles may have a spherical shape, an indeterminate shape or a slightly rounded indeterminate shape.

In the present invention, as pointed out hereinbefore, the earing promoting component and the developer component may be present on the sleeve at a weight ratio of from 80/20 to 10/90, especially from 65/35 to 20/80. In the present invention, the earing promoting component may always be held on the sleeve without isolation therefrom, or there may be adopted a method in which the earing promoting component is once isolated from the sleeve and is supplied onto the sleeve again. In the former case, only the developer component is packed in a developer vessel and is supplied onto the sleeve, and the developer-supplying operation is carried out in the same manner as in case of an ordinary one-component type developer and the supplying operation is facilitated. In the latter case, since mixing of the earing promoting component and the developer component is performed also in the developer vessel, the flowability is further improved and prevention of blocking becomes more complete.

According to one preferred embodiment of the present invention, there is provided a method for developing electrostatic latent images, wherein a developer-delivering sleeve having a magnet disposed in the interior thereof is arranged between the surface of a photosensitive drum having an electrostatic latent image formed thereon and a developer vessel packed only with the developer component, a magnetic brush is formed on the sleeve the earing promoting component comprising sintered ferrite particles having a particle size of 20 to 100 microns and the developer component comprising particles of a dispersion of a magnetic powder in a binder medium having a particle size of 5 to 50 microns, and at least one of the sleeve and the magnet disposed in the interior thereof is rotated.

Figure 3:
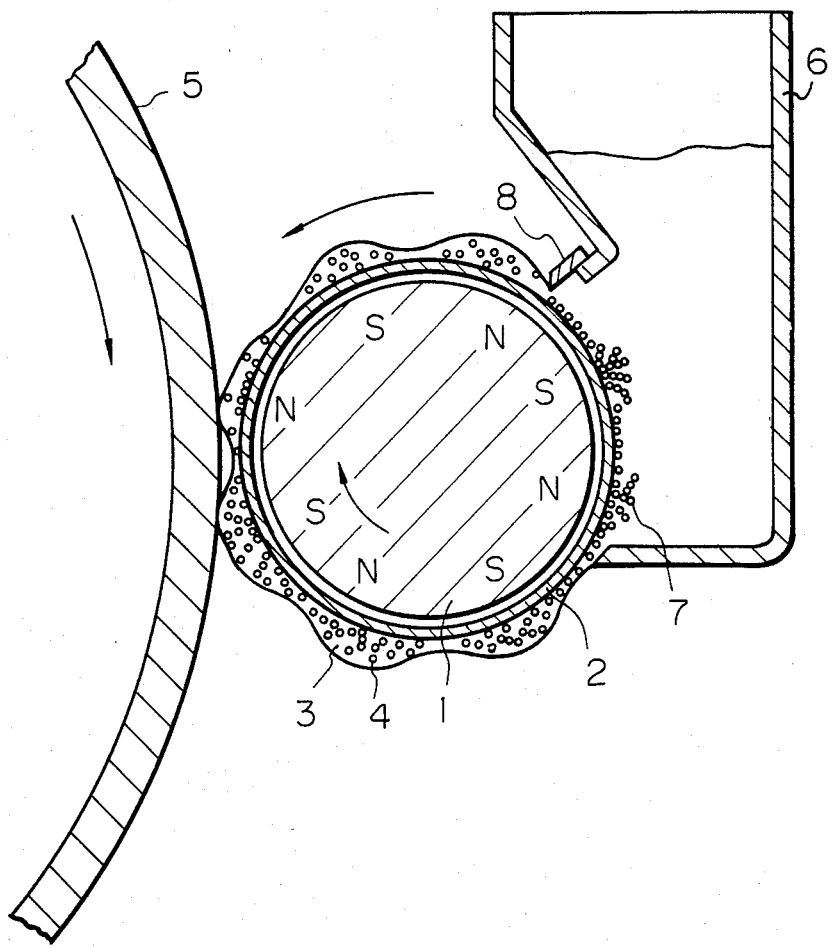
FIG. 3 is a diagram illustrating an embodiment in which a developer comprising an earing promoting component and a magnetic toner is used in a developing apparatus in which a sleeve is fixed and a magnet is rotated.

Referring to FIG. 3 illustrating this embodiment, a developer-delivering sleeve 2 provided with a magnet 1 is arranged between the surface of a photosensitive drum 5 having an electrostatic latent image formed thereon and a vessel 6 for containing only the developer component 3 therein.

As shown in FIG. 3, the magnet 1 has a symmetric multi-polar structure having poles S and N arranged alternately along the inner circumference of the sleeve, and the sleeve 2 is fixed but the internal magnet 1 is rotatably arranged.

Referring to FIG. 3, the photosensitive drum 5 is rotated in the clockwise direction and the magnet 1 is rotated in the same direction, that is, the clockwise direction. With rotation of the magnet 1, the earing promoting component 4 and developer component 3 are moved, while being rotated, along the surface of the sleeve in the direction opposite to the rotation direction of the magnet 1, and good earing is attained according to the above-mentioned mechanism. Thus, the electrostatic latent image is frictionally contacted with the so-formed magnetic brush and the latent image is developed by the developer component. Incidentally, on the magnetic brush supply side of an opening 7 of the developer vessel 6, an ear cutting plate 8 is arranged to adjust the earing quantity.

In this embodiment, it is preferred that as shown in FIG. 3, the magnet 1 within the sleeve 2 be driven and rotated and the sleeve 2 be stopped or rotated. In the case where the magnet 1 is fixed, in order to deliver the developer, it is necessry to rotate the sleeve 2. In this case, however, mixing of the earing promoting component and the developer component is likely to be uneven. In contrast, if the magnet is rotated according to this embodiment of the present invention, uniform mixing of the earing promoting component and the developer component is always maintained on the sleeve, and good and unifrom earing is always attained on the sleeve. The reason has not precisely been elucidated, but from the results of the observations and experiments, it is conjectured that although movements of the earing promoting component on the sleeve are regular movements such as perpendicular, sideway and inversive movements when the sleeve is rotated and the magnet is fixed, irregular movements such as rotation and revolution are simultaneously caused together with the above regular movements in the earing promoting component when the magnet is rotated, whereby mixing of the earing promoting component with the developer component is effected very efficiently. Furthermore, it is construed that another reason is that although the unevenness of the mangetic force has a significant influence when the manget is fixed, the influence of this unevenness is moderated when the manget is rotated.

In this embodiment of the present invention, by rotating the magnet 1 in the same direction as the rotation direction of the photosensitive drum 5, the movement of the magnetic brush in the portion of the contact between the magnetic brush and the photosensitive drum is smoothened.

The moving speed of the photosensitive drum is 20 to 60 rotations per minute, and the moving speed of the magnet is 500 to 1000 rotations per minute.

Figure 4:
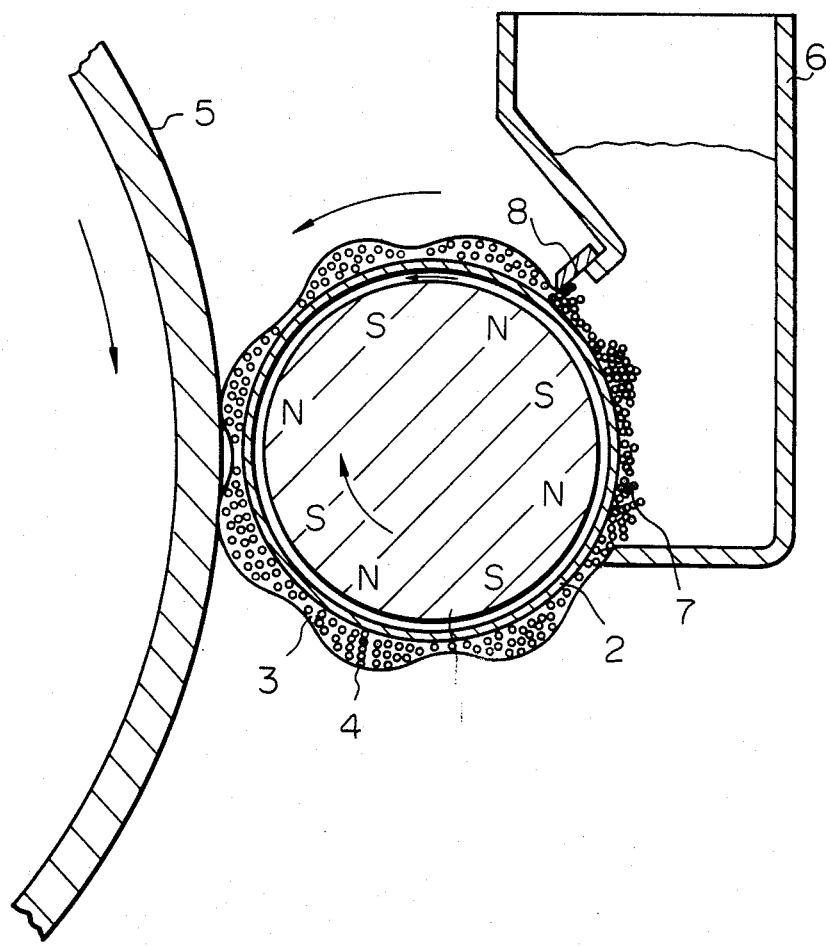
FIG. 4 is a diagram illustrating an embodiment in which a developer comprising an earing promoting component and a magnetic toner is used in a developing apparatus in which a magnet and a sleeve are rotated.

Referring to FIG. 4 illustrating the embodiment of the present invention in which the sleeve is rotated with the magnet, the sleeve 2 is rotatably arranged, and the sleeve 2 is rotated in the direction reverse to the rotation direction of the magnet 1, that is, in the counter-clockwise direction, whereby the moving speed of the developer as a whole can be increased. Namely, because of increase of the difference of the moving speed between the developer component 3 and the earing promoting component 4, the stirring action is enhanced and earing is more improved and uniformalized. In this embodiment, the moving speed of the mangetic 1 is 500 to 1000 rotations per minute, and the moving speed of the sleeve is 100 to 400 rotations per minute.

In accordance with another embodiment of the present invention, there is provided a method for developing electrostatic latent images, wherein a developer-delivering sleeve having a magnet disposed in the interior thereof is arranged between the surface of a photosensitive drum having an electrostatic latent image formed thereon and a developer vessel for containing only a developer component therein, a magnetic brush is formed on the sleeve with an earing promoting component comprising sintered ferrite particles having a particle size of 20 to 100 microns and a developer component comprising particles of a dispersion of a magnetic powder in a binder medium having a particle size of 5 to 50 microns, the sleeve is rotated, and an asymmetric magnet comprising poles S and N arranged alternately along the inner circumference of the sleeve but also comprising adjacent poles S or N at a position other than the developer supply zone is arranged and fixed in the sleeve.

Figure 5:
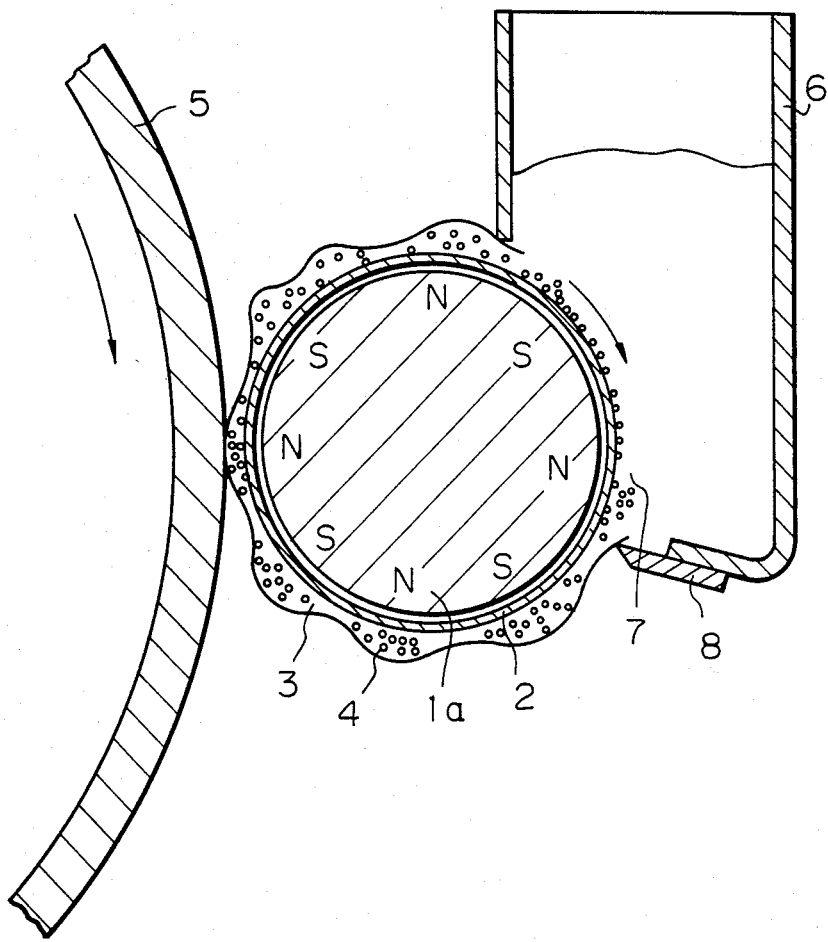
FIG. 5 is a diagram illustrating an embodiment in which a developer comprising an earing promoting component and a magnetic toner is used in a developing apparatus comprising an asymmetric multi-polar magnet.

Referring to FIG. 5 illustrating this embodiment, the arrangement of the respective members is substantially the same as in FIG. 3 except that a magnet 1a is fixed but a sleeve 2 is rotatably arranged. This magnet 1a has an asymmetric structure in which poles S and N are arranged alternately along the inner circumference of the sleeve and poles S or N are arranged adjacently to each other at a position other than a developer supply zone 7.

As pointed out hereinbefore, in the case where the magnet is fixed and the sleeve is rotated, separation is caused between the earing promoting component 4 and the developer component 3 and earing is likely to be uneven. According to this embodiment of the present invention, between the adjacent poles S or N, hopping of the earing promoting component or separation of the earing promoting component from the sleeve is caused to give a mixing and stirring effect, whereby separation of both the components is prevented and uniform earing is maintained on the sleeve.

It is preferred that the moving speed of the sleeve be 100 to 500 rotation per minute, and adjacent poles S and S or N and N may be arranged at one position or at two or more positions.

In accordance with still another embodiment of the present invention, there is provided a method for developing electrostatic latent images, wherein a developer-delivering sleeve having a magnet disposed in the interior thereof is arranged between the surface of a photosensitive drum having an electrostatic latent image formed thereon and a developer vessel for containing a developer therein, a magnetic brush is formed on the sleeve with an earing promoting component comprising sintered ferrite particles having a particle size of 20 to 100 microns and a developer component comprising particles of a dispersion of a magnetic powder in a binder medium having a particle size of 5 to 50 microns.

the sleeve is rotated, and a magnet comprising poles S and N arranged alternately along the inner circumference of the sleeve and having a non-magnetized portion in at least a part of the developer vessel is arranged and fixed in the sleeve.

Figure 6:
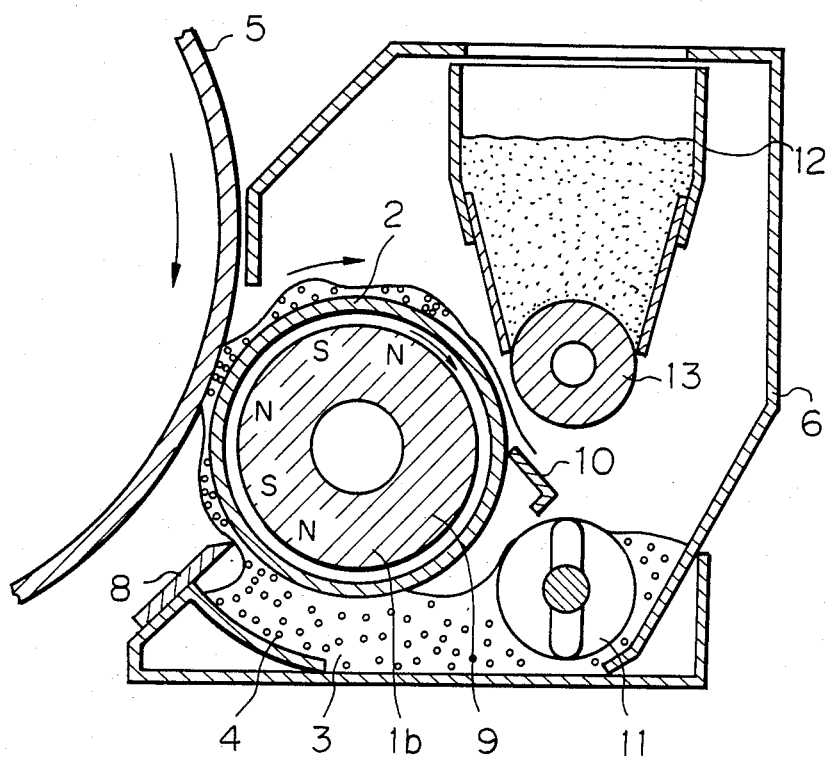
FIG. 6 is a diagram illustrating an embodiment in which a developer comprising an earing promoting component and a magnetic toner is used in a developing apparatus comprising a magnet having a non-magnetized portion.

Referring to FIG. 6 illustrating this embodiment of the present invention, the arrangement of the photosensitive drum, sleeve and developer vessel is substantially the same as in the embodiment shown in FIG. 3 except that as in the embodiment shown in FIG. 5, the sleeve 2 is rotatably arranged but the magnet 1b is fixed. This magnet 1b is characterized in that poles S and N are arranged alternately along the inner circumference of the sleeve but the magnet 1b has a non-magnetized portion 9 in at least a part of the developer vessel.

A scraping plate 10 having the top end falling in contact with the sleeve 2 is mounted in the developer vessel 6 to correspond to the non-magnetized portion 9, and a developer stirring mechanism 11 is disposed on the discharge side of the scraping plate 10. A tank 12 for containing only the developer component 3 is arranged in the developer vessel 6, and the developer component 3 is supplied into the developer vessel 6 by rotating a feed roller 13 as occasion demands.

In this embodiment of the present invention, the magnetic brush which has performed the developing operation is easily scraped from the sleeve 2 into the developer vessel 6 by the scraping plate 10 in the non-magnetized portion 9 of the magnet 1, and the earing promoting component 4 and the developer component 3 are uniformly stirred and they are supplied onto the sleeve 2 again in the form of a homogeneous mixture, whereby separation of the earing promoting component 4 from the developer component 3 is effectively controlled. The rotation speed of the sleeve may be the same as in the embodiment illustrated in FIG. 5.

In each of the foregoing embodiments, if the magnetic brush formed on the sleeve with the earing promoting component and developer component is passed through a concentrated parallel magnetic field region on the sleeve, a more stable magnetic brush can be formed.

Figure 7:
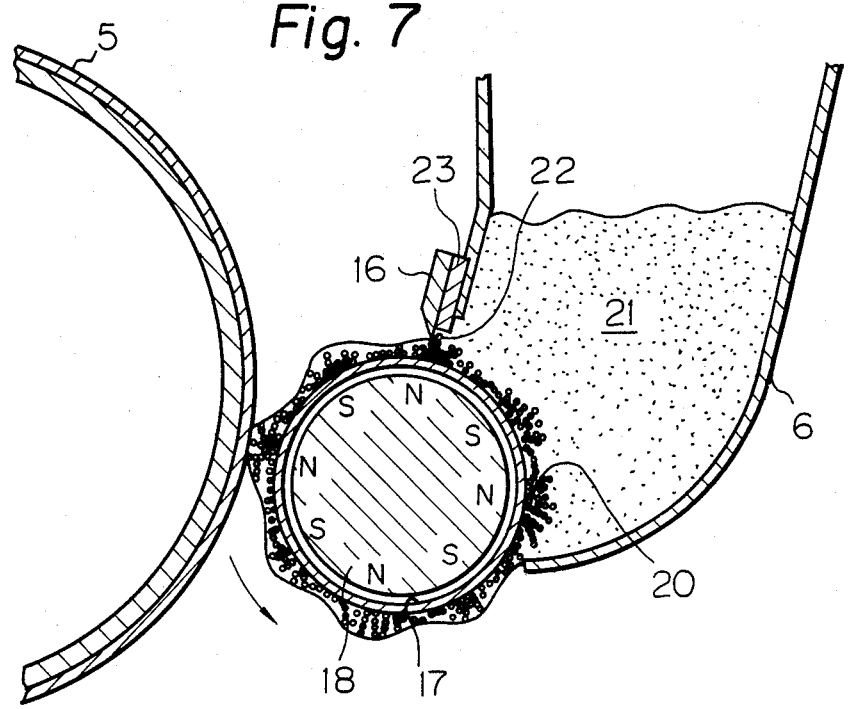
FIG. 7 is a side view illustrating the arrangement of an embodiment of the developing apparatus to be used in the present invention.
Figure 8:
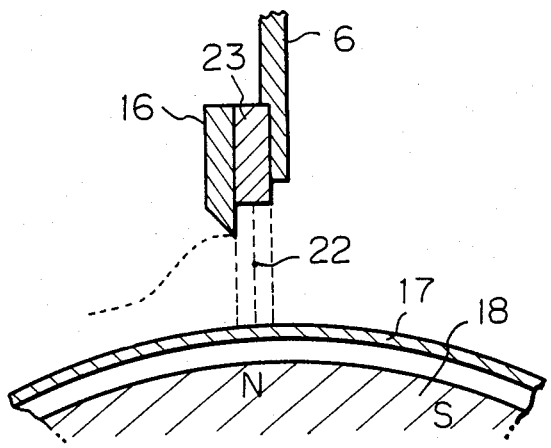
FIG. 8 is an enlarged view showing a concentrated parallel magnetic field region.

In this case, as shown in FIGS. 7 and 8, an earing promoting mechanism 23 constructed by a plate or the like of a magnetic material is arranged with a certain distance from the surface of a sleeve 17 so as to form a concentrated parallel magnetic field region 22 on the sleeve 17. In an embodiment illustrated in FIG. 7, the earing promoting mechanism 23 is arranged in proximity to the magnetic brush introduction side of an ear cutting mechanism 16 formed of a non-magnetic material, a concentrated parallel magnetic field region 22 (see FIG. 8) is formed between the mechanism 23 and the pole N or S in the sleeve.

According to this embodiment of the present invention, a mixture of the above-mentioned earing promoting component 20 and developer component 21 is supplied to the concentrated parallel magnetic field region 22 of the delivering sleeve 17, and the mixture is disentangled in this region 22 so that the density is coarsened. If the mixture of the promoting component 20 and developer component 21 is thus disentangled in the density-coarsened state, the earing promoting component is always held on the sleeve 17, and even if the developer component 21 is supplied onto this earing promoting component 20, mixing and stirring of both the components can be accomplished uniformly and very effectivly without compression of the particles, with the result that the toner particles can be charged effectively and blocking of the toner particles can be prevented. This stirring with no compressive force can be accomplished only when both the components are passed through the concentrated parallel magnetic field region between the magnetic pole in the sleeve and the magnetic material 23.

Furthermore, since earing is once rendered coarse and even in this concentrated parallel magnetic field region, earing can be uniformalized along the entire length of the sleeve and an image having a uniform density can be formed without local formation of white lines or the like.

Moreover, by arranging the earing promoting mechanism 23 formed of a magnetic material in proximity to the developer introduction side of the ear cutting mechanism 16 as shown in FIG. 7, the magnetic brush is immediately cut by the non-magnetic ear cutting mechanism 16 in the state where earing is uniform and the developer density is evenly coarse, and the magnetic brush of the developer can be supplied stably and quantitatively along the entire circumference of the sleeve 17. Figuratively speaking, in this embodiment, the magnetic brush 19 is magnified by the earing promoting mechanism 23 as a magnetic magnifying glass and this magnified magnetic brush 19 is cut by the non-magnetic ear cutting mechanism 16, very high precision cutting of the magnetic brush, that is, high precision ear cutting, can be accomplished. Therefore, according to this embodiment of the present invention, an image having a uniform density can be formed stably along the entire surface of the photosensitive drum 5.

Furthermore, even if coarse particles formed by cohesion of the toner particles with foreign substances intruded into the developing mechanism from the outside, such as paper powder and dusts, or aggregates of the toner particles are stopped at the top end of the ear cutting mechanism 16, by the above-mentioned action of the earing promoting mechanism 23, a magnetic brush is formed to surround these stopped coarse particles or aggregates, with the result that reduction of the thickness of the magnetic brush in the portion passing through the part blocked with these particles or aggregates, that is, formation of white lines, can be prevented very effectively.

In the above-mentioned embodiment of the present invention, it is preferred that the clearance d2 between the magnetic earing promoting mechanism 23 and the sleeve 17 be larger than the clearance d1 between the ear cutting mechanism 16 and the sleeve-17 and the d2/d1 ratio be in the range of from 1.05 to 10, especially from 1.5 to 6.5. If the d2/d1 ratio is outside the above-mentioned range, it becomes difficult to ensure the above-mentioned functions. The clearance d1 may be in the range of from 0.1 to 1 mm customarily adopted for a one-component type magnetic developer.

The earing promoting mechanism 16 may be formed of an optional magnetic material, for example, a soft iron plate, a steel plate, a sintered ferrite plate, a nickel plate or a cobalt plate. In order to maintain good and uniform earing while preventing the waving phenomenon, it is preferred that the thickness of the earing promoting mechanism be in the range of from 0.5 to 5 mm.

The ear cutting mechanism 16 may be formed of an optional non-magnetic material, for example, brass, phosphor bronze, aluminum, duralumin, non-magnetic stainless steel, various ceramic materials, glass or plastics.

In the present embodiment, it is preferred that the magnet 18 be fixed and the sleeve 17 be rotated and delivery and cutting of the magnetic brush be performed in this state. In this case, especially good results can be obtained when the earing promoting mechanism 23 is arranged to confront the magnetic poles of the magnet 18. Incidentally, the magnetic brush 19 is moved in the same direction as the rotation direction of the sleeve.

Of course, this embodiment may also be applied to the method where the magnet is rotated and the sleeve is fixed and the method where both the magnet and the sleeve are simultaneously rotated, and advantages as described above can similarly be attained.

Figure 9:
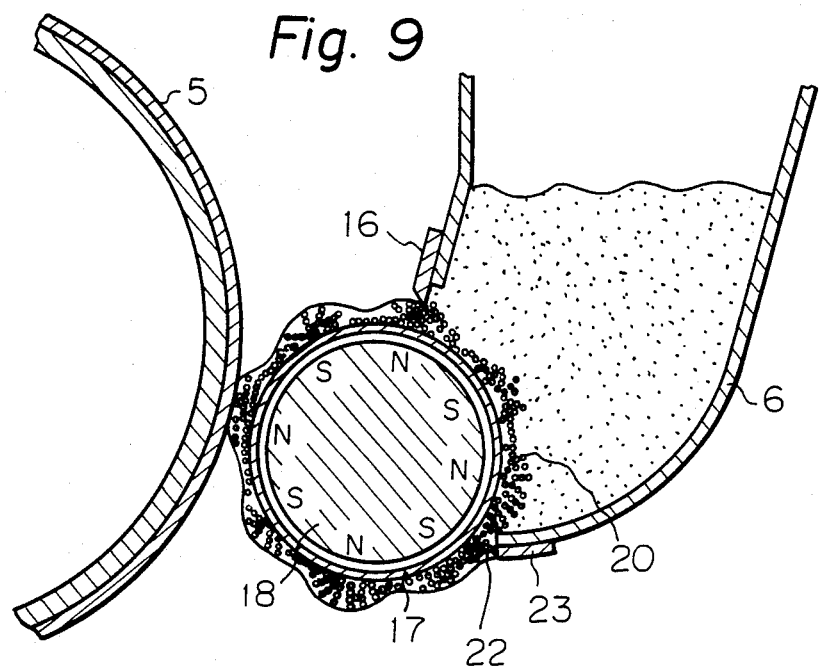
FIGS. 9 and 10 are side views showing other examples of the arrangement of the concentrated parallel magnetic field region in the developing apparatus shown in FIG. 7.
Figure 10:
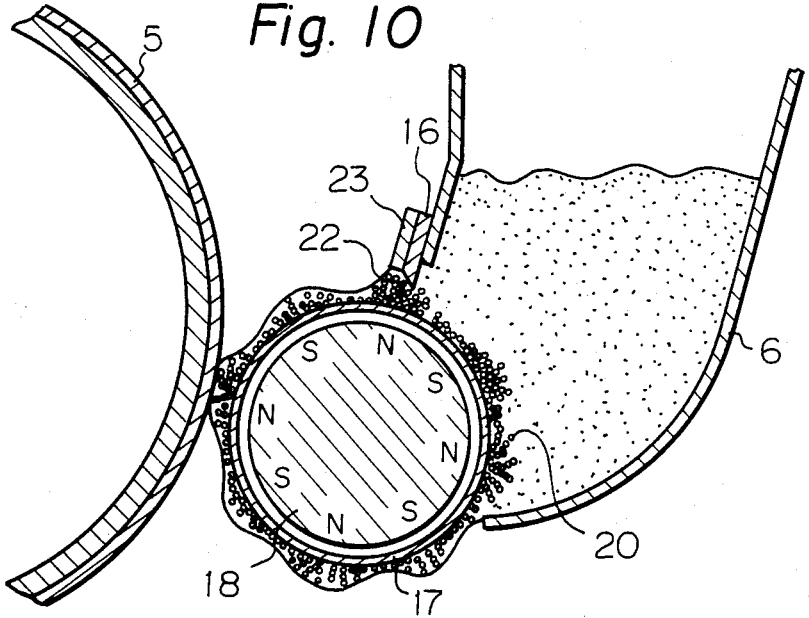

It is most preferred that the earing promoting mechanism 23 composed of a magnetic material be arranged in the positional relation shown in FIG. 7, but of course, the arrangement of the mechanism 23 is not limited to that shown in FIG. 7. For example, there may be adopted a modification in which the earing promoting mechanism 23 is arranged on the magnetic brush return side of the developer vessel as shown in FIG. 9, and a modification in which the earing promoting mechanism 23 is arranged on the magnetic brush discharge side of the ear cutting mechanism 16 as shown in FIG. 10.

As is apparent from the foregoing description, according to the present invention, good earing of a magnetic brush of the magnetic developer is always maintained irrespectively of environmental changes such as changes of the temperature, humidity and time, and an image having a good quality can be obtained by the same operation as adopted in case of an ordinary one-component type magnetic developer.

The present invention will now be described in detail with reference to the following Examples that by no means limit the scope of the invention.

The preparation of the magnetic developer component (magnetic toner) will first be described.

MAGNETIC TONER (1)

A starting material comprising 45 parts by weight of Arcon P-125 (hydrogenated styrene resin supplied by Arakawa Rinsan Kagaku Kogyo K.K.), 10 parts by weight of Nigrosine stearate (salt of 1 part by weight of Nigrosine Base with 4 parts by weight of stearic acid), 25 parts by weight of Amide AP-1 (fatty acid amide having a melting point of 98° C., supplied by Nippon Kasei K.K.), 20 parts by weight of Evaflex 420 (ethylene-vinyl acetate copolymer supplied by Mitsui Polychemical K.K.), 12 parts by weight of Special Black (carbon black supplied by Degussa Co.) and 250 parts by weight of Iron Black B6 (triiron tetroxide supplied by Toyo Shikiso K.K.) was thrown with stirring into 1000 parts by weight of heated toluene and dispersed therein over a period of 30 minutes by using a homogenizing mixer. The dispersion maintained at 70° C. was sprayed into hot air heated at 150° C. to obtain spherical dry fine particles. Classification was carried out to obtain particles having a particle size of 5 to 15 microns. The particles (100 parts by weight) were homogeneously mixed with 0.5 part by weight of Printex L (carbon black) and 0.3 part by weight of Aerosil R972 (finely divided silica) by a Henschel mixer to form a conductive magnetic toner (1). The resistivity of the toner particles was $10^8$ $\Omega$-cm.

MAGNETIC TONER (2)

A starting material comprising 14 parts by weight of Pliolite ACL (styrene-acrylic copolymer supplied by Goodyear Co.), 31 parts by weight of Hi-Wax 200P (polyethylene wax supplied by Mitsui Polychemical K.K.) and 55 parts by weight of Magnetic Iron Oxide RB-BL (triiron tetroxide supplied by Titan Kogyo K.K.) was melted and kneaded by using a hot three-roll mill and was then cooled and finely pulverized by a jet mill. The pulverization product was classified by an air classifying apparatus supplied by Alpine Co. to obtain particles having a particle size of 5 to 15 microns. Then, 2000 parts by weight of the so-obtained fixing magnetic particles having 5 to 15 microns and 100 parts by weight of Magnetic Iron Oxide RB-BL (triiron tetroxide supplied by Titan Kogyo K.K.) were charged in a Henschel mixer, and they were stirred for 30 minutes at 1500 rpm while maintaining the interior of the mixer at 50° C., to embed the triiron tetroxide particles in the surfaces of the fixing magnetic particles. Then, the mixer was cooled and 80 parts by weight of triiron tetroxide and 10 parts by weight of Aerosil R972 were further added and the mixture was stirred for 5 minutes at 1000 rpm to obtain a self-charging pressure-fixing magnetic particulate toner (2).

MAGNETIC TONER (3)

A starting material comprising 40 parts by weight of Pliolite ACL, 5 parts by weight of Viscol 550P and Iron Black B6 was melted and kneaded by a hot three-roll mill and was then cooled and finely pulverized by a jet mill. Particles having 5 to 15 microns were recovered by using an air classifying apparatus supplied by Alpine Co. Then, 2000 parts of the so-obtained fixing magnetic particles having a particle size of 5 to 15 microns and 60 parts by weight of RB-BL (triiron tetroxide) were charged in a Henschel mixer, and the mixture was stirred for 10 minutes at 2000 rpm while maintaining the interior of the mixer at 40° C., to embed a part of triiron tetroxide in the surfaces of the fixing magnetic particles. Then, the Henschel mixer was cooled, and 10 parts of Aerosil R972 was added and the mixture was stirred for 5 minutes at 1000 rpm to obtain a self-charging heat-fixing magnetic particulate toner (3).

EXAMPLE 1

In a copying machine (Mita MC-20) having a magnet-rotating sleeve-fixed developing apparatus in which the ear cutting distance was 0.4 mm and the developing distance was 0.7 mm, 6 g of sintered ferrite particles having a particle size distribution of 28 to 74 microns were caused to uniformly ear on a magnet sleeve, and 160 g of the magnetic toner (1) was charged in a hopper and 10,000 prints were continuously formed. The 10,000th print was compared with the first print with respect to the image density, fogging of the background and the uniformity of the image. It was found that there was no difference and a good image was obtained stably. Incidentally, transfer sheets which has been subjected to the insulating treatment were used. Even after formation of 10,000 prints, 6 g of the ferrite particles were left on the sleeve. Thus, it was confirmed that the ferrite particles were not consumed for the development.

EXAMPLE 2

In a copying machine (Mita MC-20) having a magnet-rotating sleeve-rotating developing apparatus in which the ear cutting distance was 0.3 mm and the developing distance was 0.7 mm, 5 g of sintered ferrite particles having a particle size distribution of 23 to 53 microns were caused to uniformly ear on a magnet sleeve, and 200 g of the magnetic toner (2) was charged in a hopper and 10,000 prints were continuously formed. When the 10,000th copy was compared with the first copy with respect to the image density, fogging of the background and the uniformity of the image, it was found that there was no difference and a good image was stably obtained. Incidentally, plain papers (BM-65 supplied by Daishowa Seishi K.K.) were used as the transfer sheets. Even after formation of 10,000 prints, 5 g of the ferrite particles were left on the sleeve. Thus, it was confirmed that the ferrite particles were not consumed for the development.

EXAMPLE 3

In a copying machine (Mita DC-161), a developer comprising 150 g of sintered ferrite particles having a particle size of 53 to 96 microns and 250 g of the magnetic toner (3) was caused to uniformly ear on a sleeve of a developing apparatus, and 250 g of the magnetic toner (3) as the reserve toner was charged in a hopper and 30,000 prints were continuously formed in a chamber maintained at 35° to 38° C. in the state where the developing bias was cut. The concentration of the magnetic toner on the sleeve was 63%. There was found no difference of the image density, fogging of the background or the image uniformity between the first print and the 30,000th print, and a good image was stably formed on the 30,000th print. After formation of 30,000 prints, the magnetic toner concentration on the sleeve was 63%.

EXAMPLE 4

In a copying machine (Mita DC-161) in which the ear cutting distance was 0.5 mm and the developing distance was 0.9 mm, 10 g of sintered ferrite particles having a particle size distribution of 28 to 74 microns were caused to uniformly ear on the sleeve, and 150 g of the magnetic toner was charged in a hopper and 30,000 prints were continuously formed. When the 30,000th print was compared with the first print with respect to the image density, fogging of the background and the uniformity of the image quality, there was found no difference, and a good image was stably formed in the 30,000th print. Plain papers (BM-65 supplied by Daishowa Seishi K.K.) were used as the transfer sheets. Even after formation of 30,000 prints, 10 g of the ferrite particles were left on the sleeve. Thus, it was confirmed that the ferrite particles were not consumed for the development.

COMPARATIVE EXAMPLE 1

In the same copying machine as used in Example 1, 100 g of the magnetic tone (1) was charged in the hopper and the copying test was carried out. At the start of the copying operation, the image density, fogging of the background and the uniformity of the image quality were not different from those in Example 1, but when 1000 prints were formed, slight reduction of the image density was caused. When about 1500 prints were formed, the uniformity of the image quality was abruptly reduced. Namely, parts having a reduced density were formed. When the earing state of the toner on the sleeve was checked, it was found that the earing quantity was locally decreased. Furthermore, it was found that the temperature of the developing sleeve was elevated to 25° to 35° C. and blocking of the toner particles was caused at the position of the ear cutting plate. If the toner was stirred in the vicinity of the ear cutting plate by a spatula, the earing state was improved and a print comparable to the print obtained at the start of the copying operation was obtained.

COMPARATIVE EXAMPLE 2

In the same copying machine as used in Example 1, 100 g of the magnetic toner (2) was charged in the hopper and the copying operation was carried out. The image density, fogging of the background and the uniformity of the image quality were the same as those in Example 2 at the start of the copying operation, but when about 1000 copies were formed, fine white longitudinal lines appeared and when about 1300 prints were formed, the number of these lines was increased. When the earing state of the toner was checked, it was found that earing was not caused here and there. Fine cellulose fiber dusts aggregated at the position of the ear cutting plate. If these dusts were removed, a copy comparable to that obtained at the start of the copying operation was obtained. When 500 prints were formed after cleaning of the ear cutting plate, lines appeared again.

COMPARATIVE EXAMPLE 3

In the same copying machine as used in Example 3, the developing bias was cut and the copying operation was carried out by using the magnetic toner (3) alone. The image density was high at the start of the copying operation, but when 100 prints were continuously formed, removal of the untransferred toner on the drum was insufficient and the entire drum was stained black with the toner, and no image was obtained.

COMPARATIVE EXAMPLE 4

In the same copying machine as used in Example 4, the continuous copying operation was carried out by using the magnetic toner (3) alone. When about 5000 prints were formed, the image density was still stable. However, if the copying operation was starting again after the lapse of one night, the image density was locally reduced in the obtained copies and blurring was observed. When the developing apparatus was checked, it was found that blocking of the toner was caused at the ear cutting plate.

COMPARATIVE EXAMPLE 5

In the same copying machine as used in Example 2, 5 g of iron oxide (STV-25T 250/400 supplied by Nippon Teppun K.K.) was caused to uniformly ear on the magnet sleeve, and 200 g of the magnetic toner was charged in the hopper and 10,000 prints were continuously formed. When about 7000 prints were formed, white lines appeared on the formed image. When the developing apparatus was checked, it was found that blocking of the toner was caused. When 10,000 prints were formed, only 1 g of iron oxide was left on the sleeve.

In Example 4, the weight ratio between the sintered ferrite particles and the developer component was changed, and the relation between the concentration of the developer component and the image density was examined. The obtained results are shown in Table 1.

TABLE 1

Relation between Developer Component Concentration and Image Density

| Run No. | Developer Component Concentration (% by weight) | Image Density |
| --- | --- | --- |
| 1 | 10 | 0.53 |
| 2 | 20 | 1.05 |
| 3 | 30 | 1.45 |
| 4 | 40 | 1.50 |
| 5 | 50 | 1.55 |
| 6 | 60 | 1.55 |
| 7 | 70 | 1.52 |
| 8 | 80 | 1.53 |
| 9 | 90 | 1.50 |

The image densities and fog densities of copies obtained in Examples 1 through 4 and Comparative Examples 1 through 5 are shown in Table 2. Incidentally, the density was measured by using Sakura Densitometer PDA65 (supplied by Konishiroku Shashin Kogyo K.K.).

TABLE 2

| | First Print | | 1000th Print | | 5000th Print | | 10000th Print | | 30000th Print | |
| --- | --- | --- | --- | --- | --- | --- | --- | --- | --- | --- |
| | Image Density | Fog Density | Image Density | Fog Density | Image Density | Fog Density | Image Density | Fog Density | Image Density | Fog Density |
| Example 1 | 1.25 | 0.01 | 1.26 | 0.01 | 1.24 | 0.01 | 1.25 | 0.01 | | |
| Comparative Example 1 | 1.30 | 0.01 | 1.00 | 0.01 | | | | | | |
| Example 2 | 1.45 | 0.01 | 1.45 | 0.01 | 1.50 | 0.01 | 1.44 | 0.01 | | |
| Comparative Example 2 | 1.47 | 0.01 | 1.40 | 0.01 | | | | | | |
| Comparative Example 5 | 1.51 | 0.01 | 1.50 | 0.01 | 1.48 | 0.01 | 1.28 | 0.01 | | |
| Example 3 | 1.55 | 0.01 | 1.55 | 0.01 | 1.54 | 0.01 | 1.54 | 0.01 | 1.55 | 0.01 |
| Comparative Example 3 | 1.59 | 0.01 | | | | | | | | |
| Example 4 | 1.49 | 0.01 | 1.53 | 0.01 | 1.55 | 0.01 | | | 1.53 | 0.01 |
| Comparative Example 4 | 1.58 | 0.01 | 1.60 | 0.01 | 1.58 | 0.01 | | | | |

EXAMPLE 5

In a developing apparatus of the type shown in FIG. 7, in which both the sleeve and magnet were rotated and a magnetic plate was attached on the toner hopper side of a non-magnetic ear cutting plate, 5 g of an earing promoting component comprising sintered ferrite particles of the manganese zinc iron oxide type (MFC-3 supplied by TDK Co. and having an average particles size of 40 microns and a particle size distribution of 23 to 53 microns) was caused to uniformly ear on the sleeve, and a homogeneous mixture of 100 g of the magnetic toner (3) and 0.1 g of paper powder was charged in the hopper. The developing apparatus was set in a copying machine of the pressure fixation type and 10,000 prints were continuously formed. There was found no difference of the image density, fogging of the background or the uniformity of the image quality between the first print and 10,000th print, and a good image was stably formed in the 10,000th print.

COMPARATIVE EXAMPLE 6

In the same developing apparatus as used in Example 5 except that the magnetic plate was not attached, the copying test was carried out in the same manner as described in Example 7 by using a homogeneous mixture of 5 g of the same earing promoting component as used in Example 5 and 0.1 g of paper powder. When about 1000 prints were formed, the uniformity of the image quality was reduced. Namely, white lines were formed in the copy delivering direction of the copy. When the earing state of the toner on the sleeve was checked, it was found that earing was not caused here and there, with the result that lines were formed on the image. When the developing apparatus was examined, it was found that short fibers of paper powder were entangled with the toner particles to form coarse particles and these coarse particles were filled at the ear cutting plate to inhibit the delivery of the toner.

EXAMPLE 6

In a developing apparatus of the type shown in FIG. 8 where a magnetic plate was attached to the toner introduction side of the toner hopper and both the sleeve and magnet were rotated, 7 g of the earing promoting component used in Example 5 was caused to uniformly ear on the sleeve, and a homogeneous mixture of 100 g of the magnetic toner (1) and 0.1 g of paper powder was charged in the hopper. The developing apparatus was set in the same copying machine as used in Example 5, and 10,000 prints were continuously formed. There was no difference of the image density, fogging of the background or the uniformity of the image quality between the first print and the 10,000th print, and a good image was stably formed in the 10,000th print.

Incidentally, since the magnetic toner used was electrically conductive (the volume resistivity was $10^8$ $\Omega$-cm), a transfer sheet which had been subjected to the insulating treatment was used.

COMPARATIVE EXAMPLE 7

In the same apparatus as used in Example 6 except that the magnetic plate was not attached, the copying test was carried out in the same manner as in Example 6 by using 7 g of the same earing promoting component as used in Example 6 and a homogeneous mixture of 100 g of the magnetic toner (1) and 0.1 g of paper powder. When about 800 prints were formed, white lines appeared on the formed image. When the developing apparatus was examined, it was found that aggregates of paper powder were filled at the ear cutting plate to inhibit the delivery of the toner and bring about non-earing lines on the sleeve.

EXAMPLE 7

In a developing apparatus of the type shown in FIG. 9, in which the magnet was fixed but the sleeve was rotated and a magnetic plate was attached to the toner discharge side of a non-magnetic ear cutting plate, 5 g of the same earing promoting component of ferrite particles as used in Example 5 was caused to uniformly ear on the sleeve, and a homogeneous mixture of 100 g of the magnetic toner (3) and 0.1 g of paper powder was charged in the hopper. The developing apparatus was set in a copying machine of the heat fixation type, and 10,000 prints were continuously formed. There was no difference of the image density, fogging of the background or the uniformity of the image quality between the first print and the 10,000th print, and a good image was stably formed on the 10,000th print.

of 2 cm in the original) and fog densities (the density of the non-image area) of the copies obtained in Examples 5 through 7 and Comparative Examples 6 through 9 are shown in Table 3. The density was measured by using Sakura Densitometer PDA 65 (supplied by Konishiroku Shashin Kogyo K.K.).

TABLE 3

|  | First Print | | 1000th Print | | 5000th Print | | 10000th Print | |
| --- | --- | --- | --- | --- | --- | --- | --- | --- |
|  | Image Density | Fog Density | Image Density | Fog Density | Image Density | Fog Density | Image Density | Fog Density |
| Example 5 | 1.50 | 0.01 | 1.50 | 0.01 | 1.48 | 0.01 | 1.49 | 0.01 |
| Comparative Example 6 | 1.50 | 0.01 | 1.18* | 0.01 | When 2000 prints were obtained, test was stopped because of appearance of white lines. | | | |
| Example 6 | 1.55 | 0.01 | 1.55 | 0.01 | 1.60 | 0.01 | 1.57 | 0.01 |
| Comparative Example 7 | 1.55 | 0.01 | white lines appeared when about 800 prints were obtained | | | | | |
| Example 7 | 1.61 | 0.01 | 1.60 | 0.01 | 1.58 | 0.01 | 1.55 | 0.01 |
| Comparative Example 8 | 1.60 | 0.01 | white lines appeared when about 600 prints were obtained | | | | | |
| Comparative Example 9 | 1.49 | 0.01 | 1.24* | 0.01 | when 3000 prints were obtained, test was stopped because of appearance of white lines | | | |

Note
*lines differing in the density were formed in the formed image in parallel to the copy delivering direction as precursors of white lines, resulting in drastic reduction of the image density.

COMPARATIVE EXAMPLE 8

In the same developing apparatus as used in Example 7 except that the magnetic plate was not attached, the copying test was carried out in the same manner as described in Example 7 by using 5 g of the earing promoting component used in Example 7 and a homogeneous mixture of 100 g of the magnetic toner (3) and 0.1 g of paper powder. When about 100 prints were formed, the uniformity of the image quality was reduced though no change was seen at first sight. Namely, although white lines were not observed, longitudinal lines slightly differing in the density were found, and when earing of the toner on the sleeve was examined, there locally appeared portions of a low toner density (high earing promoting component concentration), which formed the above-mentioned lines on the sleeve. The developing apparatus was set in the copying machine again and the copying was continued again. When about 600 prints were formed, white lines were formed. When the developing apparatus was checked, it was found that the delivery of the toner was inhibited by aggregates of paper powder and earing was not caused here and there.

COMPARATIVE EXAMPLE 9

In the same developing apparatus and copying machine as used in Example 5, the copying test was carried out by charging a homogeneous mixture of 100 g of the magnetic toner (2) and 0.1 g of paper powder into the hopper without using the earing promoting component. When about 2300 prints were formed, white lines appeared on the formed image. It was found that aggregates of paper powder were filled at the ear cutting plate to inhibit the delivery of the toner and bring about nonearing lines on the sleeve.

The image densities (the density of the image area corresponding to the shear black portion having a side

What is claimed is:

1. A method for developing electrostatic latent images, which comprises frictionally contacting the surface of a substrate having an electrostatic latent image formed thereon with a magnetic brush of a developer formed on a developer-delivering sleeve having a magnet disposed therein, wherein a magnetic brush is formed on the sleeve with an earing promoting component consisting essentially of sintered ferrite particles having a residual magnetism of 0 to 1.0 e.m.u./g, a coercive force of 0 to 5 Oe and a particle size of 20 to 100 microns, and a developer component comprising particles of a dispersion of a magnetic powder in a binder medium having a particle size of 5 to 50 microns, and the ratio of the earing-promoting component to the developer component being within the range of 80:20 to 10:90, and wherein the electrostatic latent image is developed only by the developer component.

2. A method for developing electrostatic latent images, wherein a developer-delivering sleeve having a magnet disposed in the interior thereof is arranged between the surface of a photosensitive drum having an electrostatic latent image formed thereon and a developer vessel packed only with the developer component, a magnetic brush is formed on the sleeve with an earing promoting component consisting essentially of sintered ferrite particles having residual magnetism of 0 to 1.0 e.m.u./g, a coercive force of 0 to 5 Oe and a particle size of 20 to 100 microns, and the developer component comprising particles of a dispersion of a magnetic powder in a binder medium having a particle size of 5 to 50 microns, and at least one of the sleeve and the magnet disposed in the interior thereof is rotated, and the ratio of the earing-promoting component to the developer component being within the range of 80:20 to 10:90, and wherein the electrostatic latent image is developed only by the developer component.

3. A method according to claim 2, wherein the sleeve is fixed and the magnet in the interior of the sleeve is rotated in the same direction as the rotation direction of the photosensitive drum.

4. A method according to claim 2, wherein the magnet is rotated and the sleeve is rotated in the direction opposite to the rotation direction of the magnet in the interior of the sleeve.

5. A method for developing electrostatic latent images, wherein a developer-delivering sleeve having a magnet disposed in the interior thereof is arranged between the surface of a photosensitive drum having an electrostatic latent image formed thereon and a developer vessel for containing only a developer component therein, a magnetic brush is formed on the sleeve with an earing promoting component consisting essentially of sintered ferrite particles having a residual magnetism of 0 to 1.0 e.m.u./g, a coercive force of 0 to 5 Oe and a particle size of 20 to 100 microns and a developer component comprising particles of a dispersion of a magnetic powder in a binder medium having a particle size of 5 to 50 microns, the sleeve is rotated, and an asymmetric magnet comprising poles S and N arranged alternately along the inner circumference of the sleeve but also comprising adjacent poles S or N at a position other than the developer supply zone is arranged and fixed in the sleeve, and the ratio of the earing-promoting component to the developer component being within the range of 80:20 to 10:90, and wherein the electrostatic latent image is developed only by the developer component.

6. A method for developing electrostatic latent images, wherein a developer-delivering sleeve having a magnet disposed in the interior thereof is arranged between the surface of a photosensitive drum having an electrostatic latent image formed thereon and a developer vessel for containing a developer therein, a magnetic brush is formed on the sleeve with an earing-promoting component consisting essentially of sintered ferrite particles having a residual magnetism of 0 to 1.0 e.m.u./g, a coercive force of 0 to 5 Oe and a particle size of 20 to 100 microns and a developer component comprising particles of a dispersion of a magnetic powder in a binder medium having a particle size of 5 to 50 microns, the sleeve is rotated, and a magnet comprising poles S and N arranged alternately along the inner circumference of the sleeve and having a non-magnetized portion in at least a part of the developer vessel is arranged and fixed in the sleeve, and the ratio of the earing-promoting component to the developer component being within the range of 80:20 to 10:90, and wherein the electrostatic latent image is developed only by the developer component.

7. A method according to any of claims 1, 2, 5 and 6, wherein the magnetic brush comprising the earing promoting component and the developer component is passed through a concentrated paralled magnetic field region on the sleeve.

8. A method according to claim 7, wherein the concentrated parallel magnetic field region is formed in proximity to the developer introduction side of an ear cutting mechanism formed of a non-magnetic material.

* * * * *